United States Patent
Han (10) Patent No.: US 10,401,927 B2
(45) Date of Patent: Sep. 3, 2019

(54) WIRELESS GRAPHICS CARD MONITORING DEVICE

(71) Applicant: EVGA CORPORATION, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 192 days.

(21) Appl. No.: 15/602,113

(22) Filed: May 23, 2017

(65) Prior Publication Data

US 2018/0341300 A1 Nov. 29, 2018

(51) Int. Cl.
*G06F 1/20* (2006.01)
*G06F 3/14* (2006.01)
*G05B 15/02* (2006.01)
*F24F 11/70* (2018.01)
*G09G 3/04* (2006.01)
*G09G 3/36* (2006.01)

(52) U.S. Cl.
CPC .............. *G06F 1/206* (2013.01); *F24F 11/70* (2018.01); *G05B 15/02* (2013.01); *G06F 3/14* (2013.01); *G09G 3/04* (2013.01); *G09G 3/36* (2013.01)

(58) Field of Classification Search
None
See application file for complete search history.

(56) References Cited

U.S. PATENT DOCUMENTS

| 2009/0163248 | A1* | 6/2009 | Liang | H04M 1/72519 455/566 |
| 2009/0225090 | A1* | 9/2009 | Chiu | G09G 5/363 345/520 |
| 2012/0192078 | A1* | 7/2012 | Bai | G06F 3/04883 715/740 |
| 2014/0028450 | A1* | 1/2014 | Murray | G08C 17/00 340/12.31 |

* cited by examiner

*Primary Examiner* — Thomas S McCormack
(74) *Attorney, Agent, or Firm* — Leong C. Lei (57) ABSTRACT

A wireless graphics card monitoring device includes a graphics card, which includes a control element in information connection with the graphics card to control hardware status data of the graphics card and mobile control software loaded in a mobile device and in wireless information connection with the control element ton control and display the hardware status data. The control element is operable to control the hardware status data, such as an operation temperature of the graphics card, a rotational speed of a fan, or a processing frequency. The mobile control software controls and displays the hardware status data. As such, a user may use the mobile control software of the mobile device to establish wireless connection with the control element to monitor and control the hardware status data of the graphics card.

7 Claims, 7 Drawing Sheets

WIRELESS GRAPHICS CARD MONITORING DEVICE

(a) TECHNICAL FIELD OF THE INVENTION

The present invention relates generally to a wireless graphics card monitoring device, and more particularly to a wireless graphics card monitoring device that allows a mobile device to monitor and control, in a wireless manner, hardware status data of a graphics card.

(b) DESCRIPTION OF THE PRIOR ART

The progress of science and technology makes popularization of computers increasingly high so that people may acquire knowledge in an easier way. The computers even change the living style of human beings. However, the computers need a graphics card to transmit and convert an image signal to be displayed on a display device. Excessive heat will be generated when the graphics card is processing data, and the temperature of the graphics card rises. Therefore, it is often to provide a cooling device on the graphics card to help lower the temperature of the graphics card down a range suitable for normal operation, preventing instable operation, or even malfunctioning, of the graphics card due to high temperature. Some computer users require a high operation frequency of the graphics card and it needs to constantly monitor the processing frequency of the graphics card. When the graphics card is operated in an overclocking way, it also needs to raise the cooling performance of the cooling system. Using a graphics card monitoring device to conduct monitoring on a graphics card allows for easy adjustment of the graphics card to the most perfect condition of operation.

However, a conventional graphics card monitoring device carries out monitoring of a graphics card by means of a computer and it become impossible to timely control the status of the graphics card without the computer. Consequently, the graphics card may get unexpected failure due to inadvertency. This causes inconvenience of use.

Thus, it is a challenge of those devoted in this field to provide a solution to overcome such problems.

SUMMARY OF THE INVENTION

In view of the above problems and drawbacks, the present invention aims to provide a wireless graphics card monitoring device that allows for monitoring and controlling of hardware status data of a graphics card with a mobile device.

The primary objective of the present invention is to provide monitoring and controlling of hardware status data of a graphics card through an arrangement of a control element.

Another objective of the present invention is to allow a user to conveniently conduct monitoring and controlling, in a wireless manner, over a graphics card through wireless information connection established between a mobile device and a control element by means of mobile control software.

An arrangement that the present invention adopts to achieve the above objectives comprises, structurally, a graphics card, which comprises a control element in information connection with the graphics card to control hardware status data of the graphics card. Also provided is mobile control software loaded in a mobile device and the mobile control software is in wireless information connection with the control element to control and display the hardware status data. As such, the control element may monitor and control hardware status data, including an operation temperature of the graphics card, a rotational speed of a fan, and a processing frequency of the graphics card and a user is allowed to conduct timely monitoring and controlling over the hardware status data of the graphics card through wireless information connection between the mobile device and the control element, making the use easy and convenient.

With the above techniques, the problems of the prior art graphics card monitoring device that no remote wireless monitoring and controlling of hardware status data of the graphics card is available can be overcome so as to achieve improvements of the above-described beneficial advantages of the present invention as described above.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
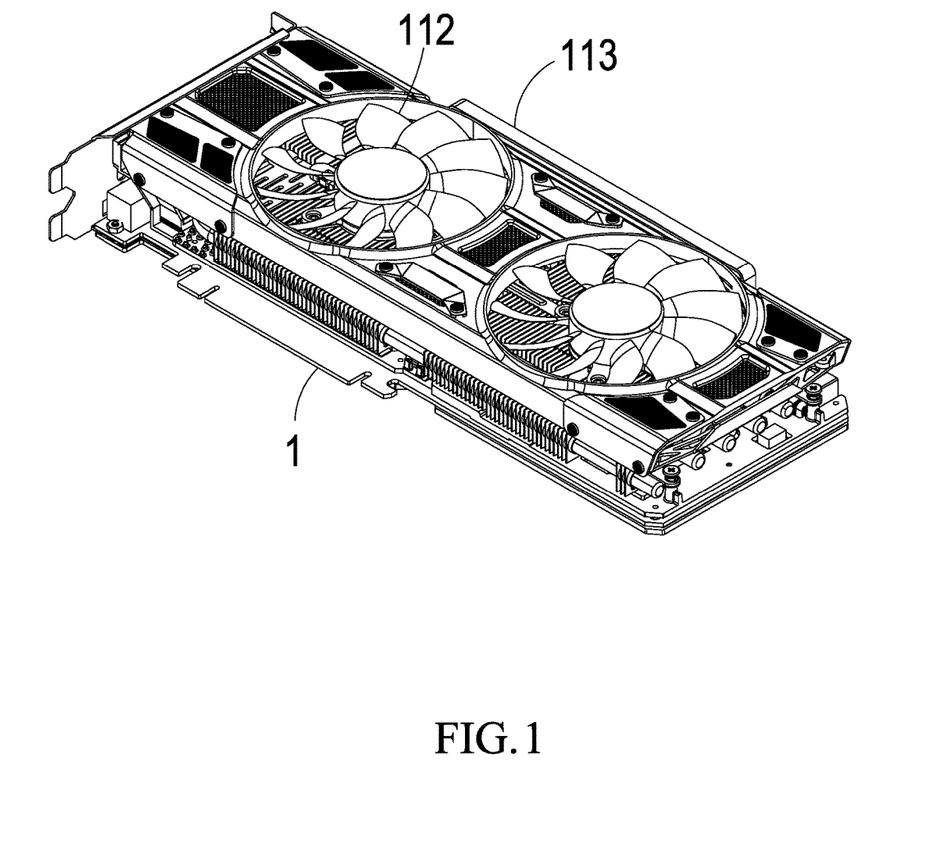
FIG. 1 is a perspective view showing a graphics card according to a preferred embodiment of the present invention.
Figure 2:
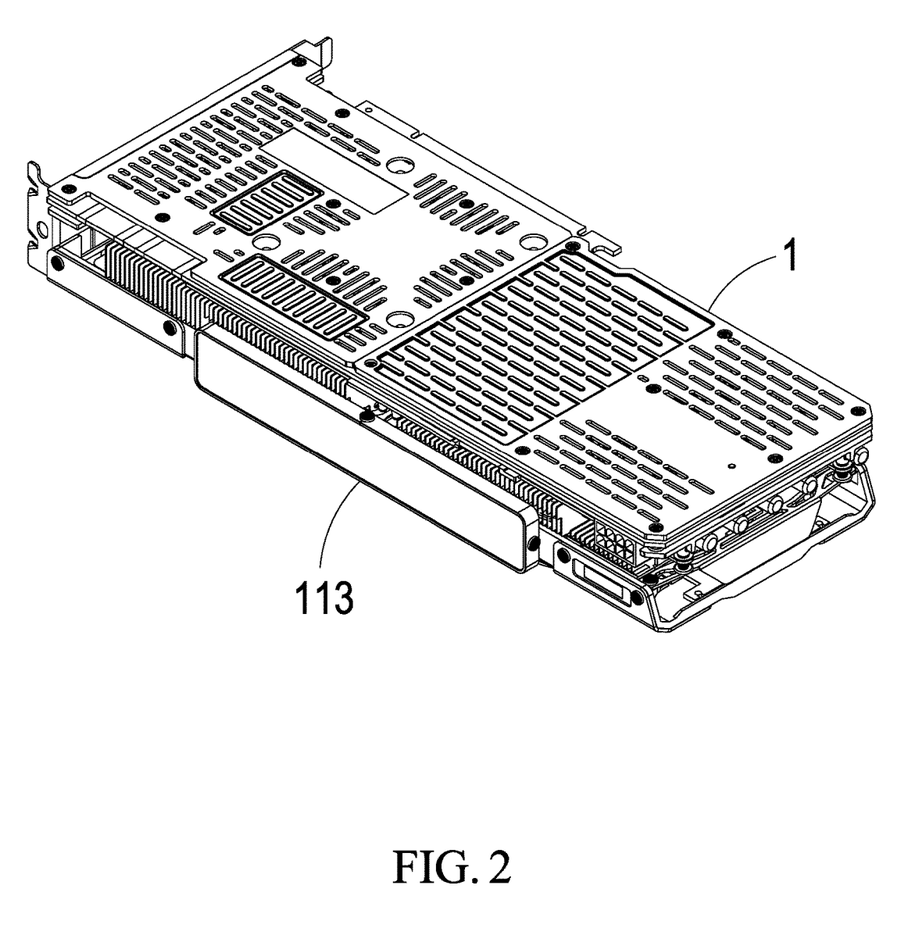
FIG. 2 is a perspective view, taken from a different angle, showing the graphics card according to the preferred embodiment of the present invention.
Figure 3:
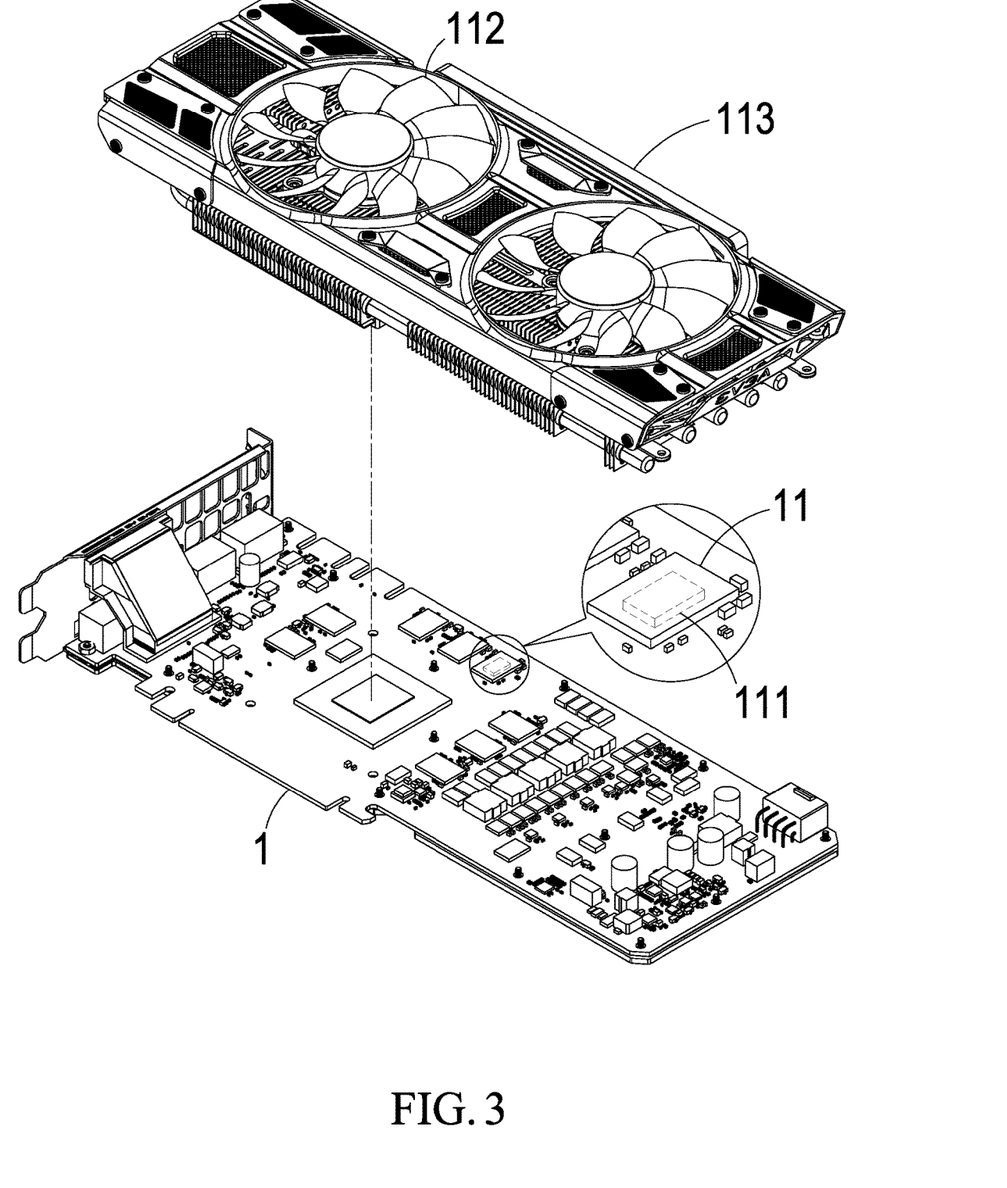
FIG. 3 is an exploded view of the graphics card according to the preferred embodiment of the present invention.
Figure 4:
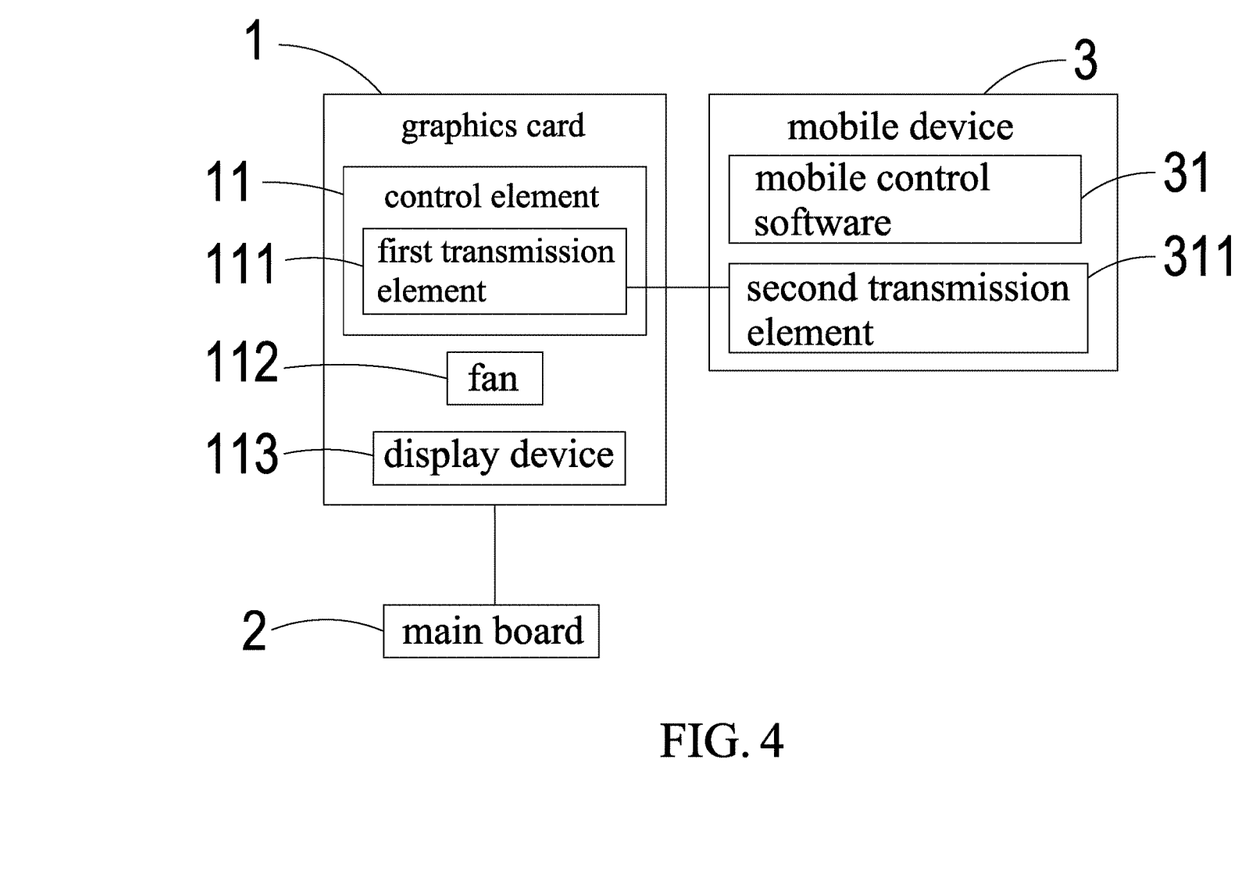
FIG. 4 is a structure block diagram of the preferred embodiment of the present invention.

Referring to FIGS. 1-4, which are respectively a perspective view showing a graphics card according to a preferred embodiment of the present invention, a perspective view, taken from a different angle, showing the graphics card according to the preferred embodiment of the present invention, an exploded view of the graphics card according to the preferred embodiment of the present invention, and a structure block diagram of the preferred embodiment of the present invention, the drawings clearly show the present invention comprises:

a graphics card 1, which comprises a control element 11 that is in information connection with the graphics card 1 to control hardware status data of the graphics card 1, wherein the hardware status data comprises one of an operation temperature, a rotational speed of a fan 112, and a processing frequency and the control element 11 comprises a first transmission element 111;

at least one fan 112 that is arranged above the control element 11;

a main board 2 that is arranged at one side of the graphics card 1;

a display device 113 that is arranged at one side of the control element 11 and is in information connection with the control element 11 to display the hardware status data of the graphics card 1, wherein the display device 113 is one of a liquid crystal display (LCD) and a seven-segment display; and mobile control software 31 that is arranged in a mobile device 3 and is in wireless information connection with the control element 11 to control and display the hardware status data, wherein the mobile device 3 comprises a second transmission element 311, which is in information connection with the mobile control software 31 and is in wireless information connection with the first transmission element 111.

Figure 5:
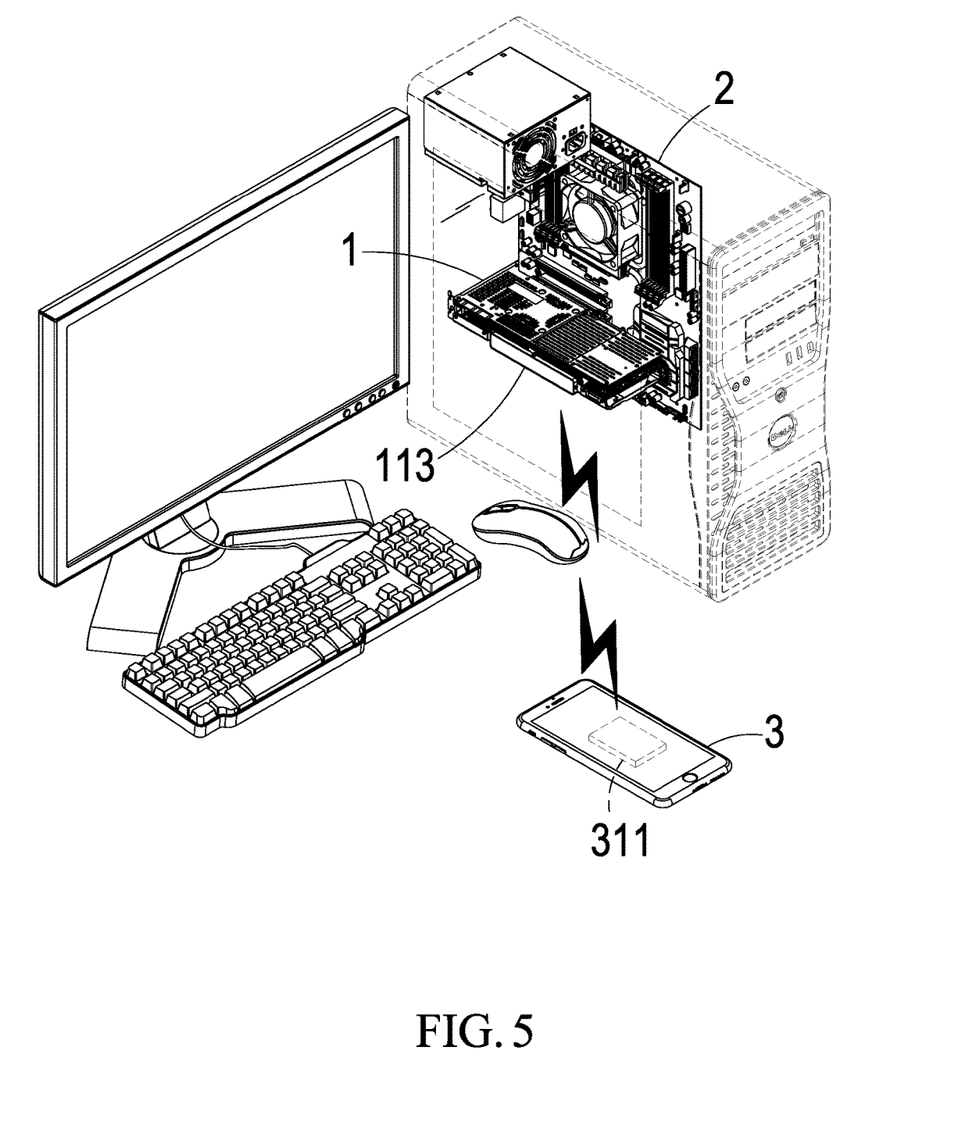
FIG. 5 is a schematic view illustrating an application of the preferred embodiment of the present invention.
Figure 6:
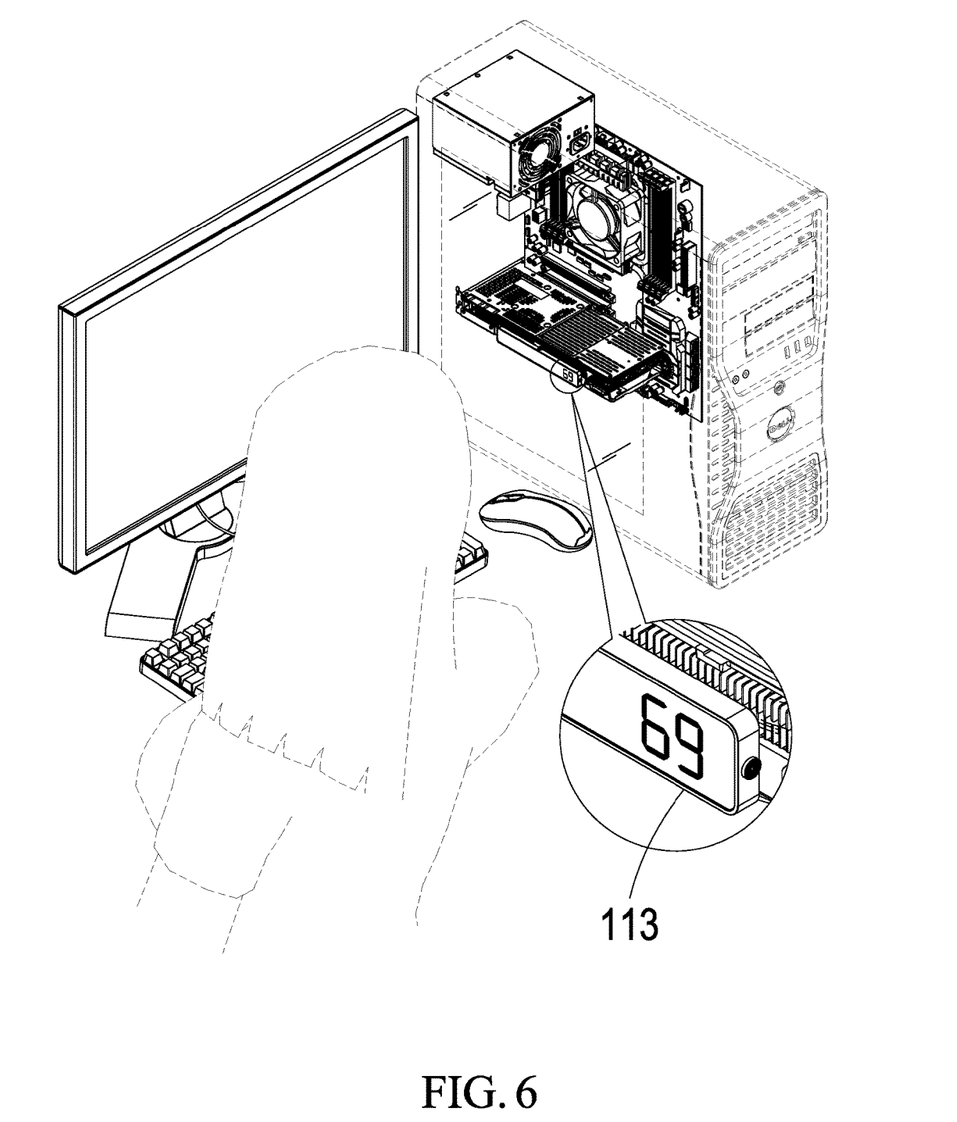
FIG. 6 is a schematic view illustrating observation of a display device according to the preferred embodiment of the present invention.
Figure 7:
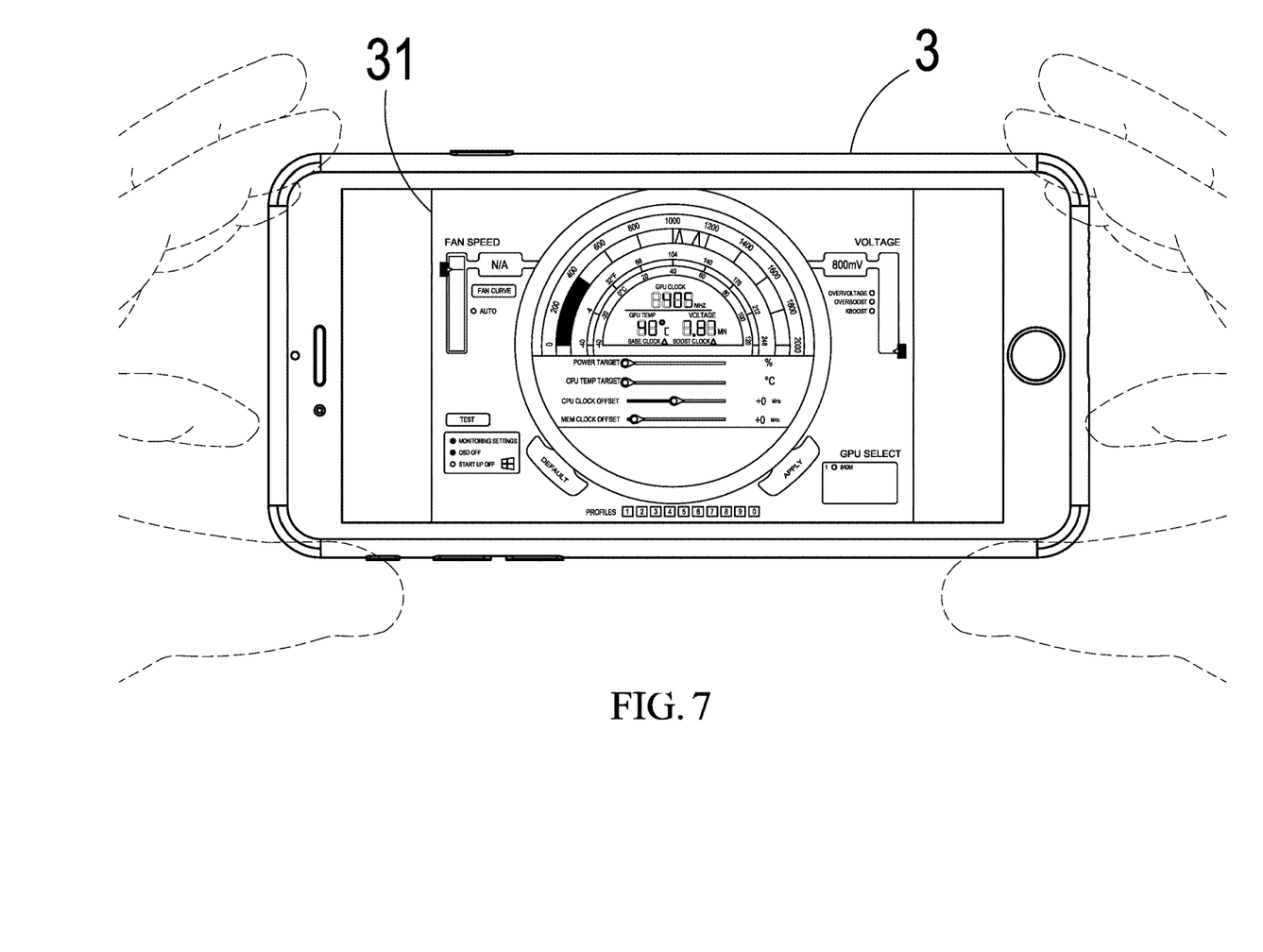
FIG. 7 is a schematic view illustrating an operation of mobile control software according to the preferred embodiment of the present invention.

Referring collectively to FIGS. 1-7, which are respectively a perspective view showing a graphics card according to a preferred embodiment of the present invention, a perspective view, taken from a different angle, showing the graphics card according to the preferred embodiment of the present invention, an exploded view of the graphics card according to the preferred embodiment of the present invention, a structure block diagram of the preferred embodiment of the present invention, a schematic view illustrating an application of the preferred embodiment of the present invention, a schematic view illustrating observation of a display device according to the preferred embodiment of the present invention, and a schematic view illustrating an operation of mobile control software according to the preferred embodiment of the present invention, it can be clearly seen that with the above components properly assembled, the control element 11 may read hardware status data of the graphics card 1 or the main board 2 and adjusts the hardware status data. The hardware status data can be one of an operation temperature, a rotational speed of the fan 112, and a processing frequency. The fan 112 functions to dissipate heat from the graphics card 1 and the main board 2. Through wireless information connection between the first transmission element 111 and the second transmission element 311, a user is allowed to operate the mobile control software 31 of the mobile device 3 such that through information connection between the mobile control software 31 and the control element 11, wireless monitoring and controlling over the hardware status data of the graphics card 1 or the main board 2 may be achieved, making the use thereof easy and convenient. The wireless information connection between the first transmission element 111 and the second transmission element 311 can be for example Bluetooth communication and the mobile control software 31 is compatible with and operated under one of an Android system and an iOS system and may support operation systems of the mobile device 3 that are commonly available in the market. Further, the user may directly observe the hardware status data of the graphics card 1 through display information on the display device 113, where the display device 113 can be one of an LCD and a seven-segment display.

The example provided previously is concerned about just a preferred way of embodying the present invention and is not intended to impose limitations to the scope of the present invention. Minor modifications and variations that do not depart from the inventive idea of the present invention as defined in the attached claims, are considered within the scope of the present invention.

Thus, with reference to all the drawings, when put into use, the present invention provides, compared to the prior art, the following advantages:

(1) The arrangement of the control element 11 allows for monitoring and controlling of the hardware status data of the graphics card 1.

(2) The arrangement of the mobile control software 31 allows a user to conveniently and easily proceed with wireless monitoring and controlling of the graphics card 1 through wireless information connection between the mobile device 3 and the control element 11.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A wireless graphics card monitoring device, comprising:
   a graphics card, which comprises a control element in information connection with the graphics card to control hardware status data of the graphics card; and
   mobile control software arranged in a mobile device and in wireless information connection with the control element to control and display the hardware status data;
   wherein the control element of the graphics card comprises a first transmission element and the mobile device comprises a second transmission element, the second transmission element being in information connection with the mobile control software, the second transmission element of the mobile device being in direct wireless information connection with the first transmission element of the control element of the graphics card.

2. The wireless graphics card monitoring device according to claim 1, wherein a main board is arranged at one side of the graphics card.

3. The wireless graphics card monitoring device according to claim 1, wherein at least one fan is arranged above the control element.

4. The wireless graphics card monitoring device according to claim 1, wherein the hardware status data comprise one of an operation temperature, a rotational speed of a fan, and a processing frequency.

5. The wireless graphics card monitoring device according to claim 1 further comprising a display device arranged at one side of the control element and in information connection with the control element to display the hardware status data of the graphics card.

6. The wireless graphics card monitoring device according to claim 5, wherein the display device comprises one of a liquid crystal display (LCD) and a seven-segment display.

7. The wireless graphics card monitoring device according to claim 1, wherein the mobile control software is compatible with and operable under one of an Android operation system and an iOS operation system.

* * * * *